July 24, 1956  A. FERMANIAN ET AL  2,755,760
ASSEMBLING FIXTURE
Filed Sept. 7, 1951  3 Sheets-Sheet 1

INVENTORS
A. FERMANIAN
H. W. SCHAUFELBERGER
BY
ATTORNEY

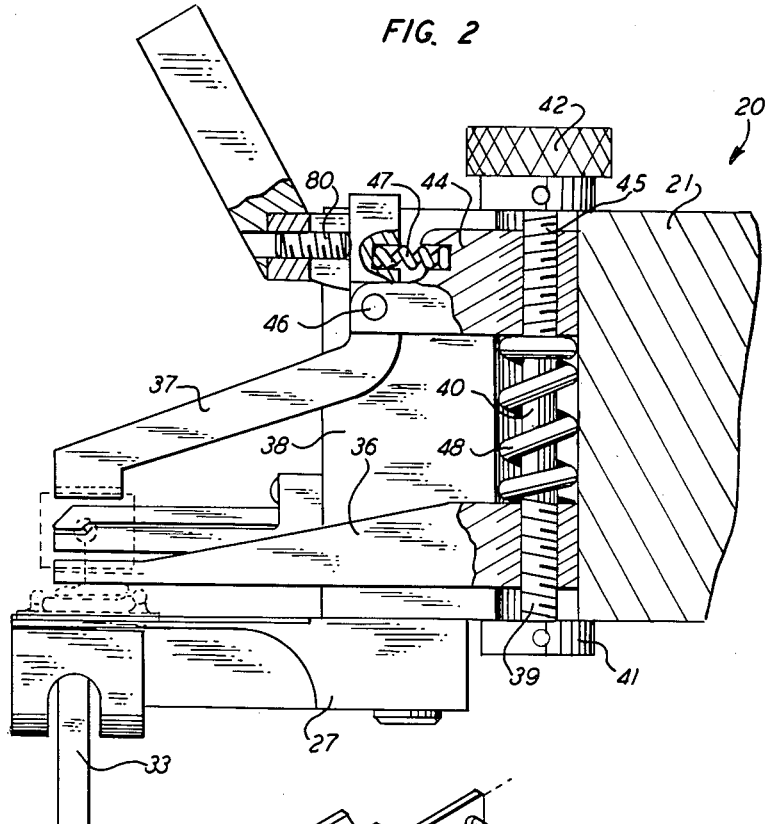
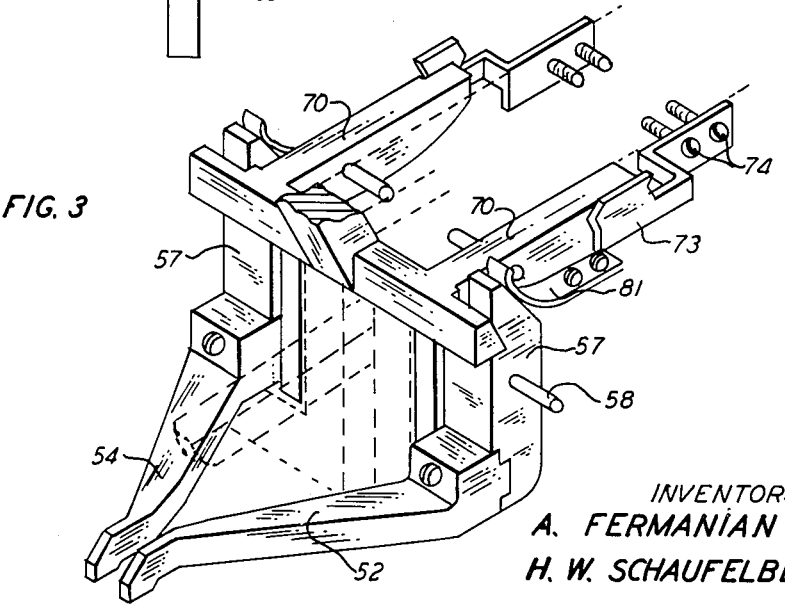

July 24, 1956     A. FERMANIAN ET AL     2,755,760
ASSEMBLING FIXTURE
Filed Sept. 7, 1951     3 Sheets-Sheet 3
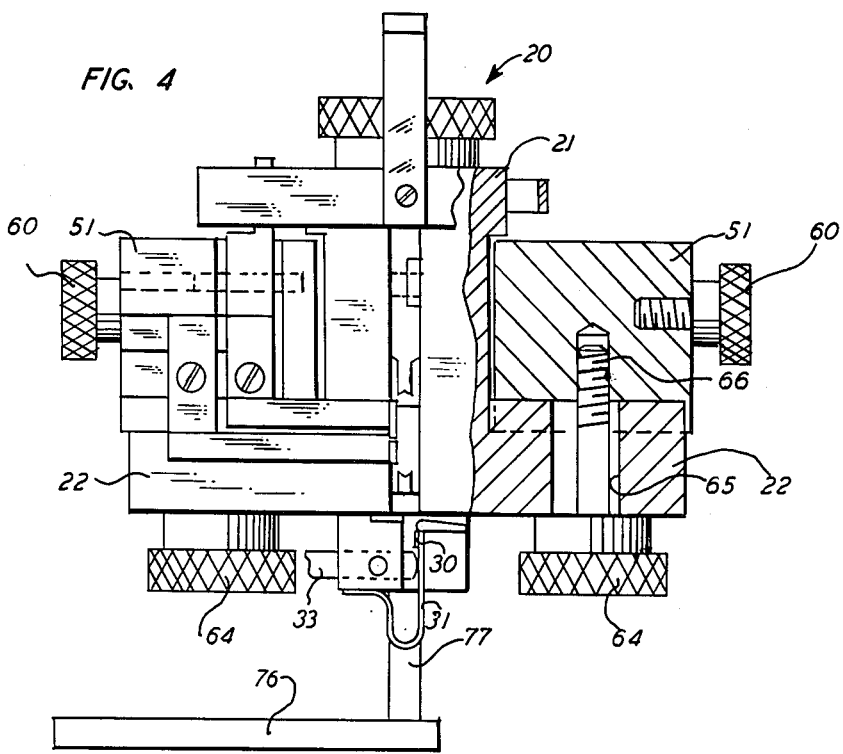
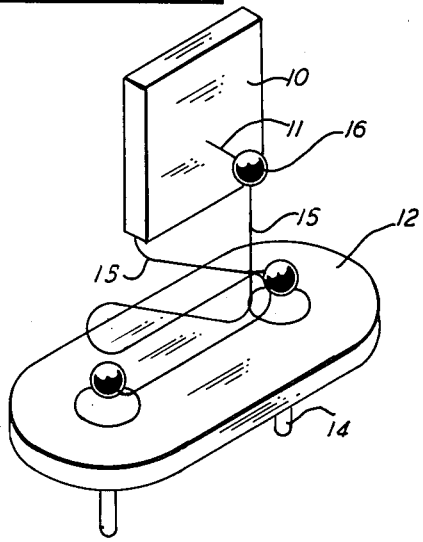
INVENTORS
A. FERMANIAN
H. W. SCHAUFELBERGER
BY
*W. C. Parnell*
ATTORNEY United States Patent Office 2,755,760
Patented July 24, 1956

2,755,760

ASSEMBLING FIXTURE

Armen Fermanian, Rutherford, and Henry W. Schaufelberger, Union, N. J., assignors to Western Electric Company, Incorporated, New York, N. Y., a corporation of New York Application September 7, 1951, Serial No. 245,556

1 Claim. (Cl. 113—99)

This invention relates to apparatus for assembling parts for attachment by soldering and more particularly to apparatus for positioning piezoelectric crystals with lead wires relative to their mounting units for attachment to the units by soldering.

Although the supporting parts or units for several types of crystals may be identical with perhaps variations in the relative positions of their yieldable members, variations do exist in the sizes of crystals. The mounting unit in the present embodiment of the invention, includes a part supporting spaced terminals on one side thereof and yieldable wirelike members extending from areas adjacent the terminals on the other side thereof to balls of solder at their outer ends to be fused to lead wires extending in opposite directions from opposing surfaces of the crystals. Frequently, with variations in the sizes of the crystals to be attached to the other part or mounting unit, there must be corresponding variations in the positions where the yieldable members are attached to the lead wires of the crystals. The accurate positioning of the parts and their members relative to each other prior to performing the soldering operation, is of vital importance to the proper operation of these parts when installed as a unit in the equipment for which it was designed.

It is the object of the present invention to provide an apparatus which is simple in structure, highly variable and efficient in operation for assembling parts of an article relative to each other for attachment by soldering.

With this and other objects in view, the invention comprises an assembling apparatus supporting one part having yieldable members in a given position while a pair of jaws, movable relative to each other, hold another part so that its lead wires may be located relative to the yieldable members. Also, pairs of locating jaws, disposed upon opposite sides of the holding jaws, are movable into open and closed positions to receive and locate the lead wires relative to the yieldable members.

Although the supporting means for the base or mounting unit of the article is located at substantially a fixed position, the holding jaws are movable like distances toward or away from each other to receive parts or crystals of various sizes maintaining center line positions for the lead wires thereof. The locating jaws may be moved relative to each other for variations in the positions of the solder attachments between the lead wires and the yieldable members required for crystals of various sizes. Suitable means such as a lever may be actuated to move all of the jaws into their open positions and to hold them open during the removal of assembled parts and the insertion of other parts for assembly.

Other objects and advantages will be apparent from the following detailed description when considered in conjunction with the accompanying drawings wherein:

Fig. 2 is a fragmentary side elevational view of the apparatus portions thereof being shown in section;

Fig. 3 is an isometric view illustrating portions of the operating mechanism;

Fig. 4 is a front elevational view of the apparatus, portions thereof being shown in section; and Fig. 5 is an enlarged isometric view of the article formed of the assembled parts.

Figure 1:
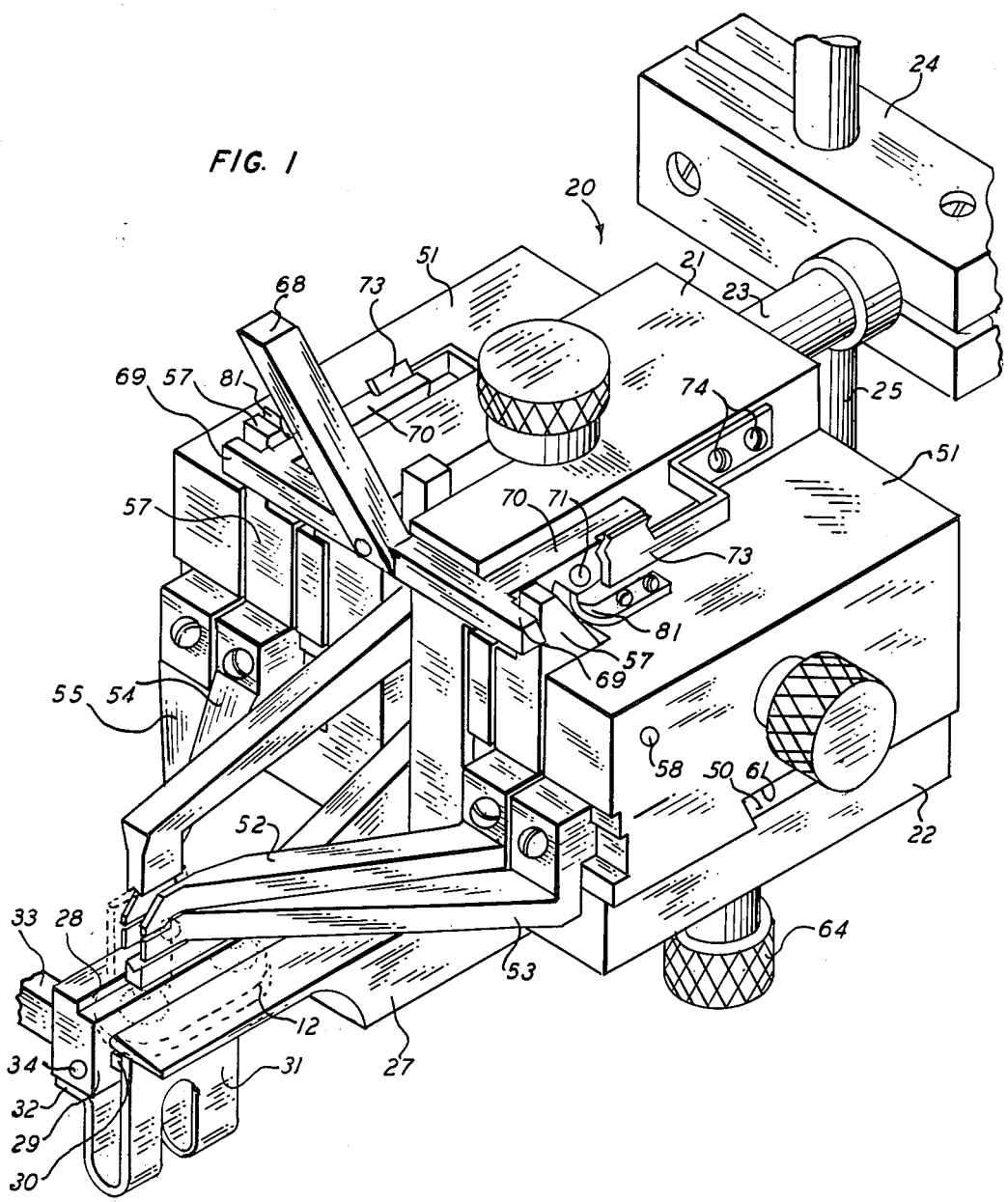
Fig. 1 is an isometric view of the apparatus.

Referring now to the drawings, attention is first directed to Fig. 5 which illustrates a first part 10 having lead wires 11 soldered to opposing faces of the part. In actual structure, the part 10 is a crystal much smaller and particularly much thinner than that shown in Fig. 5. A second part 12 has terminals 14 extending from one side thereof and yieldable members 15 secured to the terminals 14 from the other side thereof and extending in the directions shown so that the free end portions will extend vertically substantially parallel with each other and support balls of solder 16. In the assembled article, the part 10 which may vary in size, must be positioned with respect to the balls of solder 16 on the yieldable members 15 and the yieldable members must be positioned relative to the first part 10 depending upon the size of the first part, prior to completing the assembly by fusing the solder causing it to include the lead wires 11.

The apparatus for assembling the parts 10 and 12 includes a body 20 which has a vertically extending central member 21 and laterally extending side members 22. The central member of the body is secured to a spindle 23 which is journalled in a supporting block 24, the supporting block being mounted on a vertical column 25 whereby the body may be moved about the axis of the spindle and also about the axis of the column for a purpose hereinafter described.

A support 27 secured to the under-surface of the body 20 is grooved at 28 to receive the part 12. The groove 28, if desired, may partially conform to the part 12 to accurately locate the part in a given position. The terminals 14 of the part are positioned adjacent a surface 29 and will be held against the surface by a clamp bar 30. The clamp bar 30 is mounted adjacent one end of a U-shaped spring 31, the other end of the spring 31 being mounted at 32 on the under-surface of the support 27. A lever 33 pivoted at 34 and disposed in a notch of the support 27, is actuable to move the clamp bar 30 outwardly against the force of the spring 31 to free the part 12 after assembly and to condition the apparatus to receive another part 12.

Holding jaws 36 and 37, which are shown in more detail in Fig. 2, have their outer ends provided with parallel V-grooves to receive the part 10. The jaw 36 is slidably mounted in a vertical groove 38 in the central portion 21 of the body 20 with its inner end connected to a thread end 39 of an adjusting screw 40. The adjusting screw supported by the body 20, carries a collar 41 at one end, a knurled wheel 42 at the other so that the adjusting screw may be rotated but held against movement axially. A support 44 slidable in the groove 38 is connected to the upper threaded portion 45 of the adjusting screw 40. The upper jaw 37 is pivoted to the support 44 at 46 and is normally urged into its holding position by a spring 47. A spring 48 disposed concentric with the adjusting screw 40 tends to urge the jaws 36 and 37 away from each other. The threaded portions of the screw are of right and left hand threads so that the jaws may be moved like distances toward and away from each other simultaneously maintaining their outer ends like distances from given center lines wherein the lead wires are to be positioned.

The members 22 of the body 20 have dovetail portions 50 for connection with supporting units 51 for pairs of locating jaws 52—53 and 54—55. The jaws 53 and 55 are secured directly to the units 51 while the upper jaws 52 and 54 are secured to levers 57 mounted on pivots 58 carried by the units 51. Handles in the form of knurled screws 60 are mounted at the outer surface of the units 51 so that the units may be adjusted relative to each other on the body. Dovetail grooves 61 formed in the undersurface of the units 51 receive the dovetail portions 50 to maintain their alignment with each other and the relative positions of the locating jaws during adjustment for parts of various sizes. Locking screws 64 extending through elongate apertures 65 in the portions 22 and 50 of the body, enter threaded apertures 66 of the units 51 to serve in securing the units in any desired adjusted position.

The locating jaws 52—53 and 54—55, of the contours shown, extend angularly toward the holding jaws and then in parallel planes positioned known distances from the part 10 to grip the lead wires 11 lightly without damaging them and to locate the ends of the yieldable members 15 accurately known distances from the part 10.

A lever 68 when in its normal position allows the holding jaw 37, under the force of the spring 47 (Fig. 2) to cooperate with the holding jaw 36 to grip and hold the part 10. Also when in its normal position the lever 68 will allow the levers 57 with the locating jaws 52 and 54 to be moved into their locating positions relative to their respective locating jaws 53 and 55. The lever 68 has lateral members 69 positioned to engage the upper portions of the levers 57 and leg portions 70, extending parallel with respect to each other upon opposite sides of the central portion 21 of the body 20 where aligned pivots 71 carried by the central portion, support the lever for movement relative to the various jaws it is to operate. When the lever 68 is operated, that is, when the lever is moved rearwardly about its pivots 71 the holding jaw 37 is opened and the levers 57 are moved to open their locating jaws 52—54. Retaining springs 73 mounted on opposite sides of the central portion 21, as at 74, Fig. 1, have their outer ends bent at given angles to form substantially cam like surfaces to act as latches in extending over the upper surfaces of the inner ends of the leg portions 70 of the lever 68 to hold the lever operated and to thereby hold the jaws in their open positions.

The body 20 initially described as being mounted on the spindle 23 and supported by the member 24 on the column 25 may be moved into any desired position about the axis of these supporting elements 23 and 25 relative to a unit (not shown) capable of fusing the solder balls 16 to complete the assembly of the parts 10 and 12. A handle 76 secured to a member 77 mounted on the undersurface of the body 20, may be utilized in turning the apparatus into any desired position to perform the soldering operation. The apparatus is mounted on the spindle 23 in such a manner that regardless of the position in which the operator leaves the apparatus, it will return to the normal position shown when released.

Considering now the operation of the apparatus, let it be assumed that the lever 68 has been moved about its pivot 71 and latched in operated position, at which time the levers 57 will have been operated about their pivots 58 moving the jaws 52 and 54 upwardly into open positions relative to their lower jaws 53 and 55. At the same time, an adjustable screw 80 carried by the central portion of the lever 69 engages the upper portion of the jaw 37 moving it about its pivot 46 into open position. Now by the raising of the lever 33 to open the clamp 30 against the force of the spring 31, a part 12 may be inserted in place. When the operator releases the lever 33, it will drop about its pivot allowing the bar 30, forced by the spring 31, to clamp the terminals 14 of the part 12 against the surface 29, firmly holding the part in its predetermined position.

The operator then locates the part 10 in the grooved portion of the lower jaw 36 at the same time locating its lead wires 11 above or on the lower locating jaws 53 and 55. By moving the lever 68 forwardly about its pivot 71, springs 81 will move the levers 57 about their pivots to lower the jaws 52 and 54 into their locating positions shown in Figs. 1 and 2. At the same time, the holding jaw 37 will move into engagement with the part 10. When this has been accomplished, the part 10 is located at a given position with respect to the part 12 through the function of the holding members or jaws 36 and 37. Furthermore, the lead wires of the part 10 are held by the locating jaws whose other functions are to position the yieldable members 15 and control the points where they are secured to the lead wires.

The soldering operation may be performed through the movement of the apparatus into any desired position about the axis of the spindle 23 and column 25 relative to a heating unit, to fuse one of the solder balls completing its connection between the adjacent yieldable member and lead wire and later moving the apparatus to position it with respect to a heating unit to fuse the other solder ball to complete the attachment of the parts. When this has been accomplished, the apparatus may be allowed to return to its normal position at which time the operator will move the lever 68 to open the jaws, the latches 73 holding the lever operated, and the jaws open until the completed article has been released by the clamp and removed and other parts to be assembled inserted in position.

To condition the apparatus for parts of various sizes, the adjusting screw 40 may be actuated to move the jaws 36 and 37 toward and away from each other. If desired, gage blocks may be inserted singly between the jaws so that they may be located accurately relative to each other for parts of various sizes. The same may be accomplished regarding the located jaws 52—53 and 54—55. These jaws may be adjusted by loosening the screws 64 and moving the units 51 toward or away from each other after which the screws 64 may be tightened to lock the jaws in their adjusted positions.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

An apparatus for assembling parts of various sizes of articles relative to each other for attachment by soldering, wherein the first parts, which may vary in size, have aligned lead wires extending in opposing directions from opposite sides thereof for attachment of given portions thereof disposed like linear distances from the first part to solder on the ends of yieldable members of second parts, the apparatus comprising a body means fixedly mounted adjacent the body to support the second parts singly with said solder ends at given positions relative to the body, a pair of holding jaws, means carried by the body to support the jaws and actuable to move the holding jaws like distances toward or away from each other and the supporting means for the second parts to receive first parts of various sizes and hold them with their aligned lead wires in a given plane relative to said supporting means, stationary locating jaws supported by the body and extending to said given portions of the lead wires on each side of the first part and the adjacent yieldable members to locate the solder on the yieldable members at said given portions of the lead wires, companion locating jaws supported by the body for movement into open or closed positions relative to the stationary locating jaws to cooperate therewith to grip the lead wires and hold said given portions in said plane in engagement with the solder on the yieldable members relative thereto, means normally urging the companion locating jaws and the holding jaws into closed positions, an element actuable to open the holding jaws and move the companion locating jaws into open position, and a retaining member carried by the body and adapted to releasably hold the element actuated to hold the companion locating jaws and the holding jaws in their open positions.

References Cited in the file of this patent

UNITED STATES PATENTS

| | | | |
|---|---|---|---|
| 78,334 | Shimer | May 26, | 1868 |
| 598,825 | Thomas | Feb. 8, | 1898 |
| 936,368 | Schrock | Oct. 12, | 1909 |
| 2,289,511 | Marceau | July 14, | 1942 |
| 2,302,813 | Stuhlfauth et al. | Nov. 24, | 1942 |
| 2,364,689 | Brooks | Dec. 12, | 1944 |
| 2,584,297 | Schmuldt | Feb. 5, | 1952 |
| 2,608,745 | Barry | Sept. 2, | 1952 |